(12) United States Patent
Hause

(10) Patent No.: US 9,463,826 B2
(45) Date of Patent: Oct. 11, 2016

(54) METHOD FOR OPERATING AN ELECTRIC STEERING SUPPORT FOR A MOTOR VEHICLE, AND ELECTRIC STEERING SUPPORT AND ACCORDINGLY EQUIPPED MOTOR VEHICLE

(71) Applicant: FORD GLOBAL TECHNOLOGIES, LLC, Dearborn, MI (US)

(72) Inventor: Ronny Hause, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/596,671

(22) Filed: Jan. 14, 2015

(65) Prior Publication Data

US 2015/0197276 A1     Jul. 16, 2015

(30) Foreign Application Priority Data

Jan. 14, 2014   (DE) .......................... 10 2014 200 528

(51) Int. Cl.
*A01B 69/00* (2006.01)
*B62D 5/04* (2006.01)

(52) U.S. Cl.
CPC ............. *B62D 5/046* (2013.01); *B62D 5/0463* (2013.01); *B62D 5/0481* (2013.01)

(58) Field of Classification Search
CPC ....... B60W 10/20; B60W 10/30; B62D 5/00; B62D 5/046; B62D 5/0481
See application file for complete search history.

(56) References Cited

U.S. PATENT DOCUMENTS

2012/0205187 A1* 8/2012 Izutani ................. B62D 5/0481
180/446

FOREIGN PATENT DOCUMENTS

DE     102012209046     12/2012

OTHER PUBLICATIONS

German Search Report for German Application No. 102014200528.0 dated Sep. 3, 2014.

* cited by examiner

*Primary Examiner* — Michael D Lang
(74) *Attorney, Agent, or Firm* — Raymond L. Coppiellie; Brooks Kushman P.C.

(57) ABSTRACT

A system or method for steering support for a vehicle with a start-stop system is configured to temporarily switch off a running internal combustion engine at the beginning of a stop phase and to restart the internal combustion engine at the end of the stop phase. An electric motor of the steering support is operated with accumulated electric current during the stop phase. Consumption of the accumulated current is monitored from the beginning of the stop phase with future consumption of current by the electric motor estimated based on consumption during previous stop phases. The steering support is configured so that supply of the accumulated current to the electric motor during the stop phase can be regulated as required on the basis of the estimated future consumption of accumulated current by the electric motor.

15 Claims, 1 Drawing Sheet

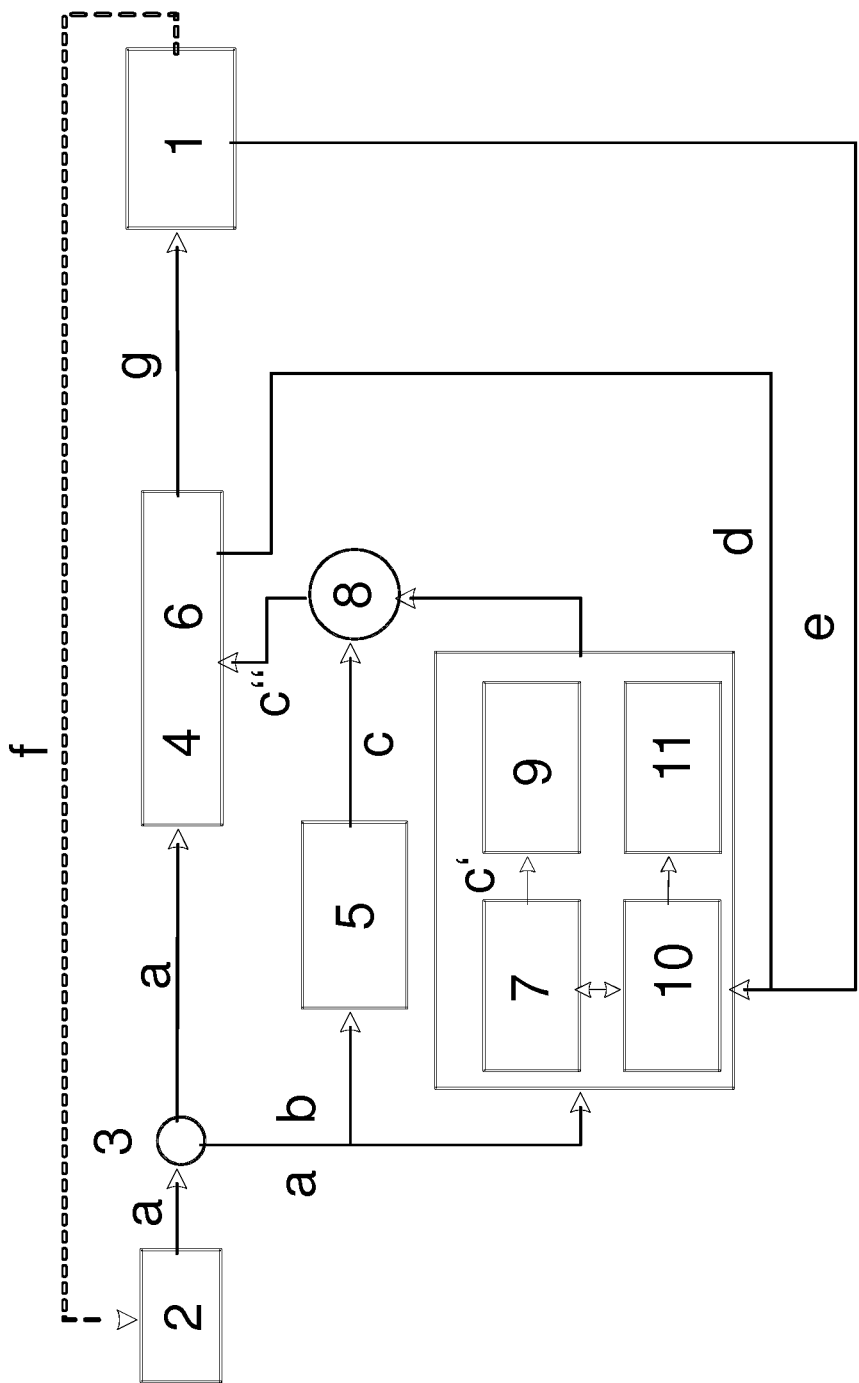

METHOD FOR OPERATING AN ELECTRIC STEERING SUPPORT FOR A MOTOR VEHICLE, AND ELECTRIC STEERING SUPPORT AND ACCORDINGLY EQUIPPED MOTOR VEHICLE

CROSS-REFERENCE TO RELATED APPLICATIONS

This application claims foreign priority benefits under 35 U.S.C. §119(a)-(d) to DE 10 2014 200 528.0 filed Jan. 14, 2014, which is hereby incorporated by reference in its entirety

TECHNICAL FIELD

The disclosure relates to a system and method for operating an electric steering support/assist for a motor vehicle with a start-stop system and also to an accordingly equipped motor vehicle.

BACKGROUND

Start-stop systems and also support and assistance systems acting on the steering apparatuses of motor vehicles are known sufficiently. The latter range from power-steering systems, which in the meantime have become fully established, to automatically acting steering systems; for example in parking situations. In addition, such systems also increasingly actively intervene in the steering process during travel in order to increase driving comfort and safety for the passengers. By contrast, start-stop systems pursue the reduction of the $CO_2$ emission by switching off the internal combustion engine of the braked motor vehicle, which in particular is braked until standstill. At the end of this stop phase, the internal combustion engine is then re-started in order to allow continued travel.

Power-steering systems differ in terms of the drive thereof. Conventional hydraulically operated power-steering systems serve primarily for pure steering force support. By contrast, new systems have an electrically driven motor (EHPS=electric hydraulic power steering). An electric hydraulic operation is thus possible, wherein the necessary hydraulic pressure is built up via the electric motor. Due to the omission of the hydraulic pump otherwise driven via the internal combustion engine, these systems already provide advantages in terms of energy. In addition, the electric motor of said systems is only switched on when required, such that there is also no longer a continuous power loss for the operational internal combustion engine. By contrast, further steering systems provide a purely electromechanical implementation (EPS=electric power steering or EPAS=electro power assisted steering). These systems dispense completely with the hydraulic portion, since the support thereof only reverts to the electric motor, which is then coupled directly to the steering system.

Due to the combination of EPS systems and start-stop systems, clear energy advantages with corresponding $CO_2$ reduction can already by attained. Since the internal combustion engine is started by a starter operating with electric current, the state of charge of the accumulator in the form of the motor vehicle battery has to be monitored in particular. The decision concerning the starting and stopping of the internal combustion engine is thus made by the start-stop system in such a way that the accumulator still has sufficient capacity at the end of the stop phase to start the internal combustion engine. In this context, a question is therefore posed concerning operation of the steering support during the stop phase, in which the internal combustion engine is switched off.

Since the electric motor of the EPS system is operated with electric current, the prior art usually provides two possibilities for operation of said electric motor during the stop phase. The EPS system may remain active during the stop phase, wherein the internal combustion engine is started in the case of detection of a steering movement. The vehicle battery when stationary therefore is not loaded by a consumption on the part of the electric motor of the EPS system. On the other hand, the EPS system can also be shifted into a rest state during the stop phase, such that no steering support is provided in the stationary condition. The EPS system is then only reactivated again following the automatic re-start of the internal combustion engine at the end of the stop phase.

Both possibilities allow only an unsatisfactory operation of the electric steering support. In particular, the re-start of the internal combustion engine by a steering movement thus leads sometimes to only short stop phases; all the more so since possible steering movements also occur completely unknowingly or unintentionally, for example when resting on the steering wheel during a body movement. Due to the stop phases, which are then actually only short, the real $CO_2$ savings are then much lower than predicted. By contrast, the other possibility of the absent support of the EPS system in the rest state indeed allows a higher $CO_2$ saving, however this is at the expense of comfort. This is manifested in particular by an unfamiliar feeling, which is necessarily brought about by the sudden loss of the steering support for the person steering the vehicle in a stop phase.

In any case, a noticeable change of the steering sensation, which ranges as far as a kickback in the steering wheel, is experienced at the end of the stop phase or by a re-start of the internal combustion engine introduced by steering movement. The kickback is to be attributed to the fact that the starter requires accumulated current in order to start the internal combustion engine, wherein the support power by the steering support is temporarily interrupted at the moment of the start. In any case, regular changing between the stop and start phase and/or a re-start of the internal combustion engine initiated by steering movement leads to adverse effects.

In view of these adverse effects, there is still by all means room to further improve the currently known possibilities for operating a steering support with an electric motor in combination with a start-stop system.

SUMMARY

On this basis, the problem addressed by the invention is to improve a method for operating a steering support for a motor vehicle with a start-stop system and also to improve a steering support for a motor vehicle with a start-stop system and to improve a corresponding vehicle, such that the steering comfort for the person steering the motor vehicle can be increased during a stop phase.

In various embodiments, a method for operating a steering support for a motor vehicle with a start-stop system configured to temporarily switch off a running internal combustion engine of the vehicle at the beginning of a stop phase and to restart the internal combustion engine in a start phase at the end of the stop phase, wherein an electric motor of the steering support is operated with electric current. The method may include operating the electric motor with accumulated electric current during the stop phase, monitoring consumption of the accumulated electric current by the electric motor from the beginning of the stop phase, estimating a future consumption of accumulated electric current by the electric motor on the basis of a previous consumption of accumulated electric current during a previous stop phase, and configuring the steering support during the stop phase so the accumulated electric current supplied to the electric motor can be regulated based on the estimated future consumption of accumulated electric current by the electric motor.

The method may include regulating the accumulated electric current once a monitoring period has elapsed following the beginning of the stop phase. The accumulated electric current supply to the electric motor during the stop phase may be regulated in such a way that a support level provided on the basis of a support request from the steering support is calculated with a factor having a value ranging from 0.0 to 1.0. In some embodiments, monitoring of the consumption of the accumulated current is terminated as soon as the start phase is identified. The beginning of the stop phase and/or the beginning of the start phase may be identified on the basis of at least one signal associated with starting of the internal combustion engine, stopping of the internal combustion engine, rotational speed of the internal combustion engine, ignition switch on, ignition switch off, speed of the motor vehicle, and acceleration of the motor vehicle. Organizing or configuring the steering support performed during the stop phase upon identification of the start phase may be adapted in such a way that a smooth or flowing transition occurs in the electric current supply to the electric motor from the regulated accumulated current to current produced via the internal combustion engine.

Embodiments may include a steering support system for a vehicle having a start-stop system configured to temporarily switch off a running internal combustion engine at the beginning of a stop phase and to restart the internal combustion engine in a start phase at the end of the stop phase, and an electric motor operated with electric current. The system may include a motor current monitor configured to monitor consumption of accumulated current by the electric motor from the beginning of the stop phase and to estimate future consumption of accumulated current by the electric motor on the basis of previous consumption of accumulated current, wherein the motor current monitor is further configured to organize the steering support during the stop phase such that supply of the electric motor with accumulated current can be regulated on the basis of the estimated future consumption of accumulated current by the electric motor. The system may also include a start-stop monitor configured to identify the beginning of the stop phase and/or the beginning of the start phase on the basis of at least one signal from starting of the internal combustion engine, stopping of the internal combustion engine, rotational speed of the internal combustion engine, ignition on, ignition off, speed of the vehicle, and acceleration of the vehicle. In some embodiments, the system includes a ramp controller configured to adapt the configuration or organization of the steering support performed during the stop phase upon identification of the start phase to provide a flowing transition in the supply to the electric motor between the regulated accumulated current and current produced via the running internal combustion engine.

BRIEF DESCRIPTION OF THE DRAWING

FIG. 1 is a block diagram illustrating operation of a system or method for vehicle steering support according to embodiments of the disclosure.

DETAILED DESCRIPTION

As required, detailed embodiments are disclosed herein; however, it is to be understood that the disclosed embodiments are merely exemplary of the invention that may be embodied in various and alternative forms. Specific structural and functional details disclosed herein are not to be interpreted as limiting, but merely as a representative basis for teaching one skilled in the art to variously employ the embodiments.

It should be noted that the features specified individually in the following description can be combined with one another in any technically expedient manner and present further embodiments of the invention. The description additionally characterizes and specifies the invention in particular in conjunction with the FIGURE.

The method according to various embodiments of the disclosure is intended for the operation of a steering support for a motor vehicle with a start-stop system. Here, the start-stop system is configured to temporarily and automatically switch off a running internal combustion engine of the motor vehicle at the beginning or start of a stop phase. Furthermore, the start-stop system ensures that the internal combustion engine is restarted at the end of the stop phase in a corresponding start phase. The steering support is operated by accumulated electric current, in particular during the stop phase. The accumulated electric current may be provided here by an accumulator, which is additionally carried, in the form of a vehicle battery.

The monitoring, which occurs from the stop phase, of the consumption of accumulated current caused by the electric motor of the EPS system is implemented by a motor current monitor.

The particular advantage of the method according to embodiments of the disclosure lies firstly in the fact that the electric motor of the steering support delivers an active support, even in the stop phase. In this way, the steering comfort for the person steering the motor vehicle is increased considerably during a stop phase. Steering movements performed during the stop phase are thus also supported by the electric motor, such that an at least approximately constant steering feel can be retained. In any case, this means that there are no adverse effects in the stop phase as a result of the support power by the steering support, which is otherwise absent outside the stop phase. Rather, the person steering the vehicle finds a substantially continuous support power both during travel and during a stop phase, and said support power does not cause any comfort losses.

Even in the case of a possible steering movement, the internal combustion engine is not started automatically, and therefore the invention enables a particularly advantageous reduction of the $CO_2$ emission in spite of increased steering comfort. As a result, the stationary periods of the motor vehicle during operation thereof can thus be used in particular to introduce corresponding stop phases. In this way, said stationary periods can be used in order to switch off the internal combustion engine and only re-start the internal combustion engine at the end of the stop phase.

Due to the monitoring of the consumption of accumulated current caused by the electric motor of the steering support, it is now possible to provide a prediction for the future consumption of said current. The estimation of the anticipated future consumption of accumulated current by the electric motor provided on the basis of the previous monitoring now allows an organization of the steering support during the stop phase. Here, the organization of the steering support means that the supply of the electric motor with accumulated current is regulated as required. In other words, a regulation is performed here by way of example on the basis of the state of charge of the car battery and the predicted future consumption of accumulated current by the electric motor.

This regulation influences the supply of the electric motor with stored or accumulated current in such a way that said electric motor obtains the respective requested amperage for providing the respective support either to the full extent or not. During the operation of the steering support in the stop phase, amperages of different levels can be requested by the electric motor. These are dependent inter alia on the steering angle and the steering speed and the respective resistance. Should the estimation made anticipate a high future consumption, the maximum possible amperage at the electric motor can be limited, for example via a threshold value. In other words, the support power by the electric motor would be lower in this case, to limit current amperage base on the threshold value.

Here, no threshold value fixed over time is preferably used to regulate the supply of the electric motor with stored or accumulated current, and therefore any peaks in the requested support power are also permitted. This can be achieved in accordance with the present disclosure by lowering the supply as a whole as required in order to enable an adaptation to the predicted consumption. Besides the estimation of the possible consumption of accumulated current by the electric motor, a prediction concerning the possible duration of the stop phase may also be made. A very precise organization of the steering support can be implemented on the basis of the two estimated variables concerning the possible consumption and the duration thereof. For this purpose, the motor current observer may also have a learning effect, which for example is based on the usual driving behavior. The estimation made can thus be improved when the vehicle in particular is always moved to the same extent and over the same path. Here, the typical duration of stops at traffic lights or in stationary traffic may then exert an influence.

In accordance with an advantageous development of the inventive concept, the regulation of the supply of the electric motor with accumulated current is only started once a previous monitoring period has elapsed. Here, the monitoring period only starts with the start of the stop phase, in which the internal combustion engine is switched off. This monitoring period is used to make an appropriate estimation concerning the future consumption of accumulated current by the electric motor. In particular, the monitoring period is thus used to monitor the consumption by the electric motor on account of steering movements so as to be able to make an estimation on this basis. Further influencing factors, such as further consumers to be supplied, can of course also be taken into consideration here. In addition, the monitoring period may sometimes be shorter, if a self-learning of the motor current monitor is provided and a certain learning effect has already occurred. If no learning effect is provided, the monitoring of the consumption by the electric motor is re-started with each stop phase. The monitoring period may range from 20 to 30 seconds depending on the embodiment.

One advantage of the method according to embodiments of the disclosure is directed to the implementation of the regulation of the electric motor in relation to the supply thereof with accumulated current during the stop phase. Accordingly, the level of support provided on account of a support request from the steering support is firstly calculated with a factor. In other words, the EPS system first calculates, in the conventional manner, a necessary level in relation to the provision of the requested support or assistance, however this is not forwarded directly to the electric motor in accordance with the disclosure. Rather, the value of the support level predefined by the EPS system is multiplied by said factor and is only then forwarded to the electric motor. In this way, the support level provided by the EPS system is in each case adapted fundamentally via the factor before the electric motor performs the corresponding support thereof. As a result, the current consumption of the electric motor can consequently be reduced as required as a result of the fact that the support level reduced via the factor requires a reduced average compared with the support level provided by the EPS system in order to generate the accordingly lower torque.

The respective value of this factor particularly preferably lies in a range from 0.01 to 1.0. Accordingly, for example with a value of 1.0 (this corresponds to 100%), the support level predefined by the EPS system by way of example can be reported to the electric motor without reduction. The regulation via the factor can be implemented particularly preferably such that it is dependent on the respective level of the value for the support predefined by the EPS system. By way of example, a low support level, with a factor closer to 1.0, may thus hardly be reduced or may not be reduced at all, whereas a high support is reduced to a greater extent with a factor further below 1.0. Accordingly, steering movements requiring a high power are supported to a lesser extent, whereas steering movements requiring only little power are hardly influenced or are not influenced at all in terms of the support thereof.

Although the person steering the motor vehicle may feel a reduction in the support power with a brief management of accumulated current, a considerable increase in comfort is provided relative to systems without any support.

In accordance with the disclosure, the monitoring of the consumption of accumulated current caused by the electric motor is also terminated as soon as the start phase is identified. This measure is based on the consideration that the basis for the estimation of the future consumption of accumulated current by the electric motor of the steering support may be based on the processes observed during the stop phase. The consumptions in and outside the stop phase may thus deviate strongly from one another, which would not enable an appropriate estimation. The negotiation of routes having many bends and/or involving many junctions can be mentioned here by way of example and may result in a high consumption of electric current outside the stop phase. By contrast, the steering movements when stationary would be reduced to a minimum, such that the previous support powers would not allow an appropriate prediction for the future course of the stop phase. In addition, the respective monitoring can be restarted with the start of each stop phase.

In various embodiments, the beginning or start of the stop phase and/or of the start phase can be identified on the basis of at least one signal from the following list: starting of the internal combustion engine; stopping of the internal combustion engine; rotational speed of the internal combustion engine; ignition on; ignition off; speed of the motor vehicle; and acceleration of the motor vehicle.

The individual signals can be monitored by way of example by a start-stop monitor. The objective here is as early an identification as possible of the respective phase so as to be able to start monitoring of the current consumption by the electric motor during the stop phase. Indeed, the signal at the start and at the end of the stop phase can also be provided from another point of the start-stop system, however such signals sometimes have a temporal offset.

In various embodiments, other signals are used either alone or additionally to the previously detailed conventional signal in order to identify the start and/or the end of the stop phase as early as possible. For example the stop of the internal combustion engine when the ignition is switched off thus indicates that a stop phase has clearly begun. Since some start-stop systems already stop the internal combustion engine when a predefined speed is undershot, the vehicle speed can therefore also be used in order to identify the start of a stop phase alone or in combination with other signals.

The organization or configuration of the steering support occurring during the stop phase may be adapted upon identification of the start phase in such a way that a flowing transition is made in the supply of the electric motor from the regulated accumulated current to the current generated via the running internal combustion engine. In this way, a possible regulation in the supply of the electric motor during the stop phase is not cancelled suddenly with the restart of the internal combustion engine, but is adapted over a defined period with a corresponding transition to the usual supply during the running of the internal combustion engine. The driving comfort is again increased hereby, since any difference in the steering behavior in relation to the support power during operation or standstill of the internal combustion engine is hardly perceived or is not perceived at all.

The adaptation of the support in the transition into and out from the stop phase can thus be implemented for example via a ramp controller, which smooths the transition between the possible differences in the respective supply over a defined period of time. By way of example the ramp controller can be actuated via the start-stop monitor, which has identified the end of the stop phase and thus the start phase. In any case, the ramp controller here controls the transition behavior between the individual states, which may be configured in a flowing manner. The transition is defined here via the respective ramp shape and the ramp time. Greater differences in the support may be compensated for over a longer ramp time, whereas only small differences in the support may have an accordingly short ramp time. In this context, there is the possibility, for the smoothing of the transition, of a linear presentation with quadratic interpolation situated toward the respective support level. To this end, at least three support points for the course of the transition are advantageously selected.

The proposed method is understood to be a supplementation to existing start-stop systems in combination with a steering support, such that these can be retrofitted in a simple manner. Of course, the method according to the invention may also be part of the start-stop system, which does not go against the actual inventive concept and is also claimed hereby.

The previously presented method according to the disclosure consequently enables the increase of the steering comfort for the person steering the motor vehicle during a stop phase with simultaneously reduced $CO_2$ emissions. Here, the invention pursues the path of a support by the electric motor of the steering support/assist, which is operated by accumulated electric current, said support also occurring during the stop phase. Thanks to the considered measure of monitoring the actual current consumption by the electric motor during a monitoring period from the start of the stop phase, a prediction for the further anticipated consumption can be made appropriately. The disclosed embodiments then make use of this estimation to regulate the supply of the electric motor with the accumulated current as required. An organization of the steering support during the stop phase is created hereby in order to enable a steering support that is as continuous as possible with simultaneously reduced $CO_2$ emission.

The disclosure further relates to a steering support for a motor vehicle for carrying out the method for operating a steering support for a motor vehicle with a start-stop system in accordance with one of the previously described embodiments, and also relates to an associated motor vehicle.

Here, the start-stop system is configured to temporarily switch off a running internal combustion engine of the motor vehicle at the start or beginning of a stop phase and to restart the internal combustion engine at the end of the stop phase, in a start phase. The steering support further comprises an electric motor, which is to be operated with electric current.

A motor current monitor is also provided. The motor current monitor is configured to monitor the consumption of accumulated current, caused by an electric motor of the steering support, from the start of the stop phase. The motor current monitor is also configured to estimate the future consumption of the electric motor of accumulated current on the basis of the previous consumption of accumulated current. The motor current monitor is also configured to configure or control the steering support during the stop phase such that the supply of the electric motor with accumulated current is regulated as required on the basis of the estimated future consumption of accumulated current by said electric motor.

The resultant advantages have already been explained beforehand in conjunction with the method and apply accordingly to the steering support and also to the vehicle with start-stop system equipped with such a steering support. This is also true for the further advantageous embodiments of the steering support according to the invention specified hereinafter. For this reason, reference is made at this juncture to the previous embodiments.

In one embodiment, a start-stop monitor can thus be provided, which is configured to identify the start of the stop phase and/or of the start phase on the basis of at least one signal from the following list: starting of the internal combustion engine; stopping of the internal combustion engine; rotational speed of the internal combustion engine; ignition on; ignition off; speed of the motor vehicle; acceleration of the motor vehicle.

In various embodiments, a ramp controller can be provided. This is designed to adapt the organization or control of the steering support performed during the stop phase when the start phase is identified, in such a way that a flowing transition in the supply of the electric motor from regulated accumulated current to the current produced via the running internal combustion engine is enabled.

Further advantageous details and effects of the invention are explained in greater detail hereinafter on the basis of an exemplary embodiment illustrated in the following FIG. 1, which shows a schematic course of the method according to the invention.

To this end, a motor vehicle 1 is firstly clear from FIG. 1, which is usually operated by a person steering the motor vehicle 1. To this end, the motor vehicle 1 has a steering wheel 2, to which a manual torque (a) can be transmitted by the person. Here, the manual torque a applied manually at the steering wheel 2 is detected by a torque sensor 3 and is transmitted to a mechanical steering transmission mechanism 4 of the motor vehicle 1. At the same time, the required support is reported to an EPS controller 5 of the steering support on the basis of the manual torque (a) and a steering angle (b). The EPS controller 5 can be formed for example as an EPS steering feel controller and/or as an EPS steering torque controller or may contain such a controller. The steering support is preferably an EPAS system.

The EPS controller 5 now calculates the necessary support by an electric motor 6 in the form of a steering support control. The electric motor 6 is coupled for this purpose to the mechanical steering transmission 4 of the motor vehicle 1. Normally, a support level (c) calculated by the EPS system 5 is then reported to the electric motor 4, which draws the necessary amperage for operation thereof and in particular for provision of the necessary torque in accordance with this specification.

A motor current monitor 7 is now provided in accordance with the invention, which serves to monitor the consumption of accumulated current caused by the electric motor 6 at the start or beginning of a stop phase. The stop phase (not shown in greater detail) is characterized in that an internal combustion engine (also does not shown in greater detail) of the motor vehicle 1 is switched off during this phase.

The motor current monitor 7 now estimates a possible future consumption of accumulated current by the electric motor 6 on the basis of the previous consumption of accumulated current by the electric motor 6. This then leads to an organization of the steering support by the electric motor 6 during the stop phase in such a way that the supply of the electric motor 6 with accumulated current is regulated as required on the basis of the estimated future consumption of accumulated current. Here, the regulation is started from a moment which starts once a monitoring period has elapsed from the start of the stop phase.

Accumulated current regulation occurs via a factor 8. To this end, the support level (c) provided on the basis of a support request from the EPS controller 5 is calculated with the factor 8 as information at the electric motor 6. Here, the respective value of this factor 8 lies in a range from 0.0 to 1.0. The result of the calculation is then reported in the form of an information item to the electric motor 6, which then performs the support with the reduced support level (c"). Here, the power of the electric motor 6 is actually controlled via a motor current limit controller 10, which is actuated by the motor current monitor 7 with the result (c'). Feedback effects in the form of the measured amperage (d) are also delivered by the electric motor 6 in the sense of a control circuit.

The monitoring of the consumption of accumulated current caused by the electric motor 6 is terminated by the motor current monitor 7 as soon as the end of the stop phase, and therefore a start phase, is identified.

To this end, a start-stop monitor 10 is provided, which serves to identify the respective phase as early as possible. Here, the start-stop monitor 10 uses signals (e), which indicate a start and/or stop of the internal combustion engine, indicate whether the ignition is on and/or off, and also supply information concerning the rotational speed of the internal combustion engine and also the speed and/or acceleration of the motor vehicle.

Furthermore, the organization, configuration, or control of the steering support performed during the stop phase upon identification of the start phase is adapted in a manner not shown in greater detail in such a way that a flowing transition occurs in the supply of the electric motor 6 from the regulated accumulated current to the current produced via the running internal combustion engine.

In addition, a ramp controller 11 is provided, which is configured, upon identification of the start phase, to adapt the organization of the steering support performed during the stop phase in such a way that a flowing transition in the supply of the electric motor 6 from the accumulated current regulated via the support level to the current produced via the running internal combustion engine is enabled.

Any mechanical feedback effects (f) via the vehicle 1, for example concerning contact with a curb or the forces when negotiating a bend, are ultimately reported back to the steering wheel 2 by the mechanical connection. The torque from mechanical steering transmission 4 and electric motor 6 is thus also transferred via a steering rod force (g) to the motor vehicle 1; in particular to steerable wheels thereof (not shown in greater detail).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a steering support for a motor vehicle with a start-stop system configured to temporarily switch off a running engine at the beginning of a stop phase and to restart the engine in a start phase at the end of the stop phase, wherein an electric motor of the steering support is operated with electric current, comprising:
   monitoring consumption of current by the electric motor from the beginning of the stop phase;
   estimating a future consumption of accumulated electric current by the electric motor based on a previous consumption during a previous stop phase; and
   controlling the steering support during the stop phase so the accumulated electric current supplied to the electric motor is regulated based on the estimated future consumption by the electric motor.

2. The method as claimed in claim 1, wherein the accumulated electric current is regulated once a monitoring period has elapsed following the beginning of the stop phase.

3. The method of claim 1 wherein the accumulated electric current supplied to the electric motor during the stop phase is regulated in such a way that a support level provided on the basis of a support request from the steering support is calculated with a factor having a value ranging from 0.0 to 1.0.

4. The method of claim 1, wherein the monitoring of the consumption of the accumulated current is terminated in response to the start phase being identified.

5. The method of claim 1, wherein the beginning of the stop phase and/or the beginning of the start phase is identified based on at least one signal associated with starting of the engine, stopping of the engine, rotational speed of the engine, ignition switch on, ignition switch off, speed of the motor vehicle, and acceleration of the motor vehicle.

6. The method of claim 1, wherein controlling the steering support performed during the stop phase upon identification of the start phase is adapted so that a flowing transition occurs in electric current supplied to the electric motor from the regulated accumulated current to current produced via the engine.

7. A steering support system for a that stops an engine at the beginning of a stop phase and restarts the engine in a start phase, comprising:
   an electric motor coupled to a steering support; and
   a motor current monitor configured to monitor consumption of accumulated current by the electric motor during the stop phase and to control motor current based on an estimated future consumption of accumulated current by the electric motor.

8. The steering support system of claim 7, further comprising:
   a start-stop monitor configured to identify the beginning of the stop phase and/or the beginning of the start phase based on at least one signal from starting of the engine, stopping of the engine, rotational speed of the engine, ignition on, ignition off, speed of the vehicle, and acceleration of the vehicle.

9. The steering support system of claim 7 further comprising:
   a ramp controller configured to adapt control of the steering support performed during the stop phase upon identification of the start phase to provide a flowing transition of current supplied to the electric motor between regulated accumulated current and current produced via the engine.

10. A vehicle comprising:
    an engine,
    a start-stop system that stops the engine during a stop phase and restarts the engine in a start phase;
    a steering support system having an electric motor; and
    a motor current monitor that monitors current consumed by the electric motor during the stop phase, estimates future consumption of current based on previous consumption, and regulates current supplied to the electric motor during the stop phase based on estimated future consumption.

11. The vehicle of claim 10 wherein the motor current monitor applies a scaling factor having a range between 0.0 and 1.0 based on the estimated future consumption.

12. The vehicle of claim 10 further comprising:
    a ramp controller configured to transition current supplied to the electric motor from one of a battery and the engine.

13. The vehicle of claim 10 wherein the motor current monitor begins monitoring current consumed by the motor in response to at least one signal selected from stopping of the engine, rotational speed of the engine, speed of the vehicle, and acceleration of the vehicle.

14. The vehicle of claim 10 wherein the motor current monitor ceases current monitoring in response to the start phase being identified.

15. The vehicle of claim 14 wherein the start phase is identified in response to at least one signal selected from starting of the engine, rotational speed of the engine, speed of the vehicle, and acceleration of the vehicle.

* * * * *